(12) United States Patent
Burke et al.

(10) Patent No.: US 8,385,985 B2
(45) Date of Patent: Feb. 26, 2013

(54) METHOD FOR REDUCING POWER CONSUMPTION IN A MULTI-MODE DEVICE

(75) Inventors: Joseph Patrick Burke, Carlsbad, CA (US); John M. Burke, La Jolla, CA (US); Ganesh M. Pattabiraman, Cupertino, CA (US); Amol Rajkotia, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 993 days.

(21) Appl. No.: 10/723,664

(22) Filed: Nov. 25, 2003

(65) Prior Publication Data

US 2005/0113151 A1    May 26, 2005

(51) Int. Cl.
*H04M 1/00* (2006.01)

(52) U.S. Cl. .......... 455/574; 455/552.1; 455/550.1; 455/572; 455/343.1

(58) Field of Classification Search .......... 455/552.1, 455/550.1, 572, 343.1, 574
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,903,746 A * | 5/1999 | Swoboda et al. | 713/501 |
| 5,940,431 A | 8/1999 | Haartsen et al. | |
| 5,983,356 A * | 11/1999 | Pandey et al. | 713/322 |
| 6,289,228 B1 * | 9/2001 | Rotstein et al. | 455/574 |
| 6,571,111 B1 * | 5/2003 | Mayo et al. | 455/574 |
| 6,574,211 B2 | 6/2003 | Padovani et al. | |
| 6,741,836 B2 * | 5/2004 | Lee et al. | 455/41.2 |
| 6,788,199 B2 * | 9/2004 | Crabtree et al. | 340/539.13 |
| 6,862,271 B2 | 3/2005 | Medvedev et al. | |
| 6,968,219 B2 | 11/2005 | Pattabiraman et al. | |
| 6,993,357 B1 | 1/2006 | Ito et al. | |
| 7,251,508 B2 | 7/2007 | Pattabiraman et al. | |

(Continued)

FOREIGN PATENT DOCUMENTS

| | | |
|---|---|---|
| CN | 1247654 | 3/2000 |
| EP | 1089578 A2 * | 4/2001 |

(Continued)

OTHER PUBLICATIONS

Lawrence E. Larson, "The Impact of Emerging "4G" Systems on the Performance and Complexity Requirements of RFICs-Invited Paper", Jun. 8, 2003, pp. 15-18.

(Continued)

*Primary Examiner* — Temesgh Ghebretinsae
*Assistant Examiner* — Richard Chan
(74) *Attorney, Agent, or Firm* — Qualcomm Patent Group; James H. Yancey, Jr.

(57) ABSTRACT

Method for reducing power consumption in a multimode device is disclosed. The multimode device includes a COMM1 component and a COMM2 component. In one aspect, a COMM1 component may be a UWB component and a COMM2 component may be a CDMA component. According to a disclosed embodiment, the time for a next scheduled COMM1 wakeup process to be performed by a COMM1 module is established. Thereafter, if the next COMM1 wakeup process is scheduled to be performed before the next COMM2 wakeup process, a COMM2 wakeup process is synchronized to be performed by a COMM2 module at the same time as the next COMM1 wakeup process. Following, when the time arrives for the COMM1 module to perform the next COMM1 wakeup process, the COMM2 module also performs the COMM2 wakeup process.

26 Claims, 3 Drawing Sheets

U.S. PATENT DOCUMENTS

| | | | |
|---|---|---|---|
| 7,333,838 | B2 | 2/2008 | Pattabiraman et al. |
| 7,868,757 | B2* | 1/2011 | Radivojevic et al. ......... 340/540 |
| 2003/0036354 | A1 | 2/2003 | Lee et al. ......................... 455/41 |
| 2003/0104848 | A1* | 6/2003 | Brideglall ..................... 455/574 |
| 2003/0128658 | A1 | 7/2003 | Walton et al. |
| 2003/0172313 | A1* | 9/2003 | Jain et al. ....................... 713/300 |
| 2004/0185857 | A1* | 9/2004 | Lee et al. ....................... 455/445 |
| 2004/0203389 | A1* | 10/2004 | Kojima et al. ................. 455/41.2 |
| 2004/0248624 | A1* | 12/2004 | Leclercq ........................ 455/574 |
| 2006/0057960 | A1* | 3/2006 | Tran ............................... 455/41.2 |
| 2006/0199558 | A1* | 9/2006 | Chiodini et al. ........... 455/234.1 |
| 2008/0056169 | A1 | 3/2008 | Pattabiraman et al. |

FOREIGN PATENT DOCUMENTS

| | | |
|---|---|---|
| EP | 1089587 A2 | 4/2001 |
| EP | 1113690 | 7/2001 |
| JP | 2001102997 | 4/2001 |
| JP | 2001507191 A | 5/2001 |
| JP | 2003189353 A | 7/2003 |
| JP | 2005500733 A | 1/2005 |
| KR | 1020000069653 | 11/2000 |
| TW | 200306717 | 11/2003 |
| WO | WO9828926 A2 | 7/1998 |
| WO | WO9949593 A1 | 9/1999 |
| WO | WO9952319 A1 | 10/1999 |
| WO | WO0135578 A1 | 5/2001 |
| WO | 03/017596 | 2/2003 |
| WO | WO03017519 | 2/2003 |
| WO | WO03073647 A1 | 9/2003 |

OTHER PUBLICATIONS

Maggio et al, "Power Saving Strategy for and UWB Impulse Radio Transceiver Using PCTH", Aug. 11, 2002, pp. 95-98.

OA dated Dec. 2, 2008 from Japanese Application No. 2006-541448, 4 pages.

Korean Office Action dated May 31, 2007 for Korean Patent Application Serial No. 2006-7012741, 8 pages.

Chinese Office Action dated Sep. 5, 2008 for Chinese Patent Application Serial No. 200480034749.2, 19 pages.

Chinese Office Action dated Aug. 21, 2009 for Chinese Patent Application Serial No. 200480034749.2, 33 pages.

European Office Action dated Nov. 30, 2007 for European Patent Application Serial No. 04812247.7, 4 pages.

Indian Office Action dated Jun. 27, 2008 for Indian Patent Application Serial No. 2701/DELNP/2006, 2 pages.

Korean Office Action dated Nov. 30, 2007 for Korean Patent Application Serial No. 2006-7012741, 3 pages.

Office Action mailed Dec. 8, 2009 for Japanese Patent Application Serial No. 2006-541448, 4 pages.

Baatz, Frank et al.: "Handoff Support for Mobility with IP over Bluetooth", 2000, IEEE, Local Computer Networks, 2000. LCN 2000. Proceedings. 25th Annual IEEE Conference, Nov. 8-10, 2000, pp. 143-154, ISBN: 0-7695-0912-6.

Bluetooth Specification Version 10B, Core, vol. 1, Dec. 1, 1999 Baseband specification, Nov. 29, 1999, pp. 95-106, XP002174708.

International Search Report and Written Opinion—PCT/US2004/039687, International Search Authority—European Patent Office—Apr. 18, 2005.

Mattison: "Low-Power Considerations in the Design of Bluetooth," ISLPED '00, Rapallo, Italy, Jul. 26, 2000, Ericsson, Lund, Sweden, pp. 151-154.

Taiwan Search Report—TW093136153—TIPO—Mar. 16, 2012.

\* cited by examiner

METHOD FOR REDUCING POWER CONSUMPTION IN A MULTI-MODE DEVICE

CROSS REFERENCE TO RELATED APPLICATIONS

This application is also related to co-pending U.S. application Ser. No. 09/930,759 filed Aug. 15, 2001 and entitled "Method for Reducing Power Consumption in Bluetooth and CDMA Modes of Operation" and U.S. application Ser. No. 10/077,123 filed Feb. 15, 2002 and entitled "Dual Mode Bluetooth/Wireless Device with Power Conservation Features".

FIELD

The present invention relates generally to wireless communication devices and systems and more specifically to reducing power consumption in wireless multi-mode communication devices.

BACKGROUND

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems designed to allow multiple users to access a common communications medium have been developed for such cellular systems. These modern communication systems may be based on code division multiple access (CDMA), Time Division Synchronous Code Division Multiple Access (TD-SCDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless systems have been established including, e.g., Advanced Mobile Phone Service (AMPS), Global System for Mobile communication (GSM), and some other wireless systems. Other wireless systems include Ultra-Wideband (UWB) systems.

UWB technology provides high speed communications over an extremely wide bandwidth. At the same time, UWB signals are transmitted in very short pulses that consume very little power. The output power of the UWB signal is so low that it looks like noise to other RF technologies, making it less interfering.

A number of different devices can be UWB-enabled, for example, mobile phones, personal digital assistants or laptop computers. Each such device is equipped with UWB components, including a receiver and transmitter, allowing it to communicate with other similarly equipped devices nearby without the use of cables or other physical connections.

As an example, a wireless code division multiple access (CDMA) mobile phone can be UWB-enabled, meaning that the mobile phone would be able to communicate with both a CDMA network and a UWB network. Such a UWB-enabled CDMA mobile phone may comprise both UWB and CDMA components.

A UWB-enabled device may be configured to communicate with wireless networks other than CDMA. Thus, a UWB-enabled device may be configured to communicate with GSM, GPRS, W-CDMA, or any other network known in the art.

A UWB-enabled device may be configured to communicate with a plurality of different types of networks. Thus, a UWB-enabled device may be configured to communicate with CDMA and GSM networks in addition to UWB networks.

Wasteful or excessive power consumption is a concern in wireless devices since it can hinder the device's operation and detract from its usefulness. Wasteful or excessive power consumption is a particular concern in multi-mode UWB devices because power can be consumed by a plurality of components that are needed to communicate with a plurality of networks.

There is therefore a need in the art for a method and related system to reduce the amount of power consumed by various components of a UWB-enabled device, such as a UWB-enabled CDMA mobile phone.

SUMMARY

Embodiments disclosed herein address the above stated needs by synchronizing the time when a second communications (COMM2) module, performs a wakeup process to the time when a first communications (COMM1) module performs a wakeup process in a multi-mode device, such as a UWB-enabled CDMA mobile phone.

In a UWB-enabled CDMA mobile phone, the COMM2 module is a UWB module and the COMM1 module is a CDMA module.

In one aspect of the invention, the time for the next scheduled COMM wakeup process to be performed by the COMM module is established. Once the time for the next scheduled COMM wakeup process has been established, the next UWB wakeup process can be synchronized to be performed by the UWB module at the same time. In one aspect, the next UWB wakeup process is only synchronized with the next COMM wakeup process if the next COMM wakeup process is scheduled to be performed before the next UWB wakeup process is scheduled to be performed. As an example, the times for when the next COMM wakeup process and the next UWB wakeup process are to be performed can be established from the current COMM time and current UWB time, respectively. Thereafter, when the time arrives for the COMM module to perform the next COMM wakeup process, the UWB module also performs a UWB wakeup process. In this manner, the COMM and UWB wakeup processes can be performed substantially simultaneously, leading to a significant reduction in the power consumed by the UWB-enabled device from performing each wakeup process separately.

In another aspect, a wireless mobile unit for synchronizing the next UWB wakeup process with the next COMM wakeup process can be assembled comprising a COMM module configured to perform a COMM wakeup process at a next scheduled time. The wireless mobile unit can further comprise a processor configured to synchronize the time of the next UWB wakeup process to the time of the next COMM wakeup process. Additionally, the wireless mobile unit can comprise a UWB module configured to perform a UWB wakeup process substantially simultaneously when the COMM module performs the next scheduled COMM wakeup process.

DETAILED DESCRIPTION

The present invention is directed to reducing power consumption in a multi-mode device. Although the invention is described with respect to specific embodiments, the principles of the invention, as defined by the claims appended herein, can obviously be applied beyond the embodiments of the description described specifically herein. Moreover, certain details have been left out in order to not obscure the inventive aspects of the invention. The specific details not described in the present application are within the knowledge of a person of ordinary skill in the art.

The drawings in the present application and their accompanying detailed description are directed to merely example embodiments of the invention. To maintain brevity, other embodiments of the invention that use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

In an embodiment, a UWB-enabled device's UWB component assumes a standby mode when the UWB-enabled device is not actively communicating with other UWB-enabled devices, i.e. it is not participating in a UWB network. While in standby mode, the UWB component searches for other UWB-enabled devices by periodically performing a wakeup process during which process it scans the surrounding environment for other UWB-enabled devices. If the UWB component encounters other UWB-enabled devices during the scanning process and determines that a connection is needed, it can perform certain protocols in order to establish a short-range, wireless connection between the phone and such other devices. Otherwise, the scanning task is turned off until a next wakeup process.

In a UWB-enabled CDMA mobile phone ("phone"), for example, the standby cycle of waking-up, scanning and turning off repeats typically once, twice, or four times every 1.28 seconds for the duration of the standby period. However, it is appreciated that certain UWB specifications may vary the timing and pattern of the cycle, for example requiring that the process be performed continuously for 1.28 seconds, or repeating the process sixteen times every 1.28 seconds. Further, certain UWB specifications may require that the UWB wakeup process be repeated, for example, at least once every 1.28 seconds, every 2.56 seconds, or any other interval which a particular specification may require.

While a UWB-enabled CDMA phone's UWB component scans for other UWB-enabled devices as discussed above, the phone's CDMA component performs CDMA related tasks. Since CDMA requires precise time synchronization between the phone and the base station, one task the CDMA component has to perform is to synchronize with the base station. In order to synchronize with the base station while in idle mode, the CDMA component "wakes up" periodically during its allotted time slots to receive and process pilot signals from the base station on a CDMA Paging Channel. The CDMA component can synchronize with the base station by processing the pilot signals. For instance, the system time can be determined from the information embedded in the pilot signals.

How frequently the CDMA component wakes up is governed by the slot cycle index, which can be set by either the phone or the base station, as is known in the art. If the slot cycle index is zero, the CDMA component performs a wakeup process every 1.28 seconds, i.e. its allotted time slot comes around every 1.28 seconds. Alternatively, the slot cycle index can be set at, for example, one, in which case the wakeup process is performed every 2.56 seconds, or two, in which case the wakeup process is performed every 5.12 seconds. Thus, the lower the slot cycle index, the more frequently the wakeup process is repeated and the greater the power consumed.

Whether it is the UWB component waking up and scanning for other UWB-enabled devices and then shutting down, or a COMM component such as a CDMA component waking up and synchronizing with the base station and then shutting down, power is consumed. Further, because each of the processes is performed repeatedly, the amount of power consumed can quickly drain the phone's power supply. Thus, a method and related system for reducing the amount of power consumed by various components of a UWB-enabled device could utilize some synchronization between its UWB component and any communication component such as a CDMA component.

Figure 1:
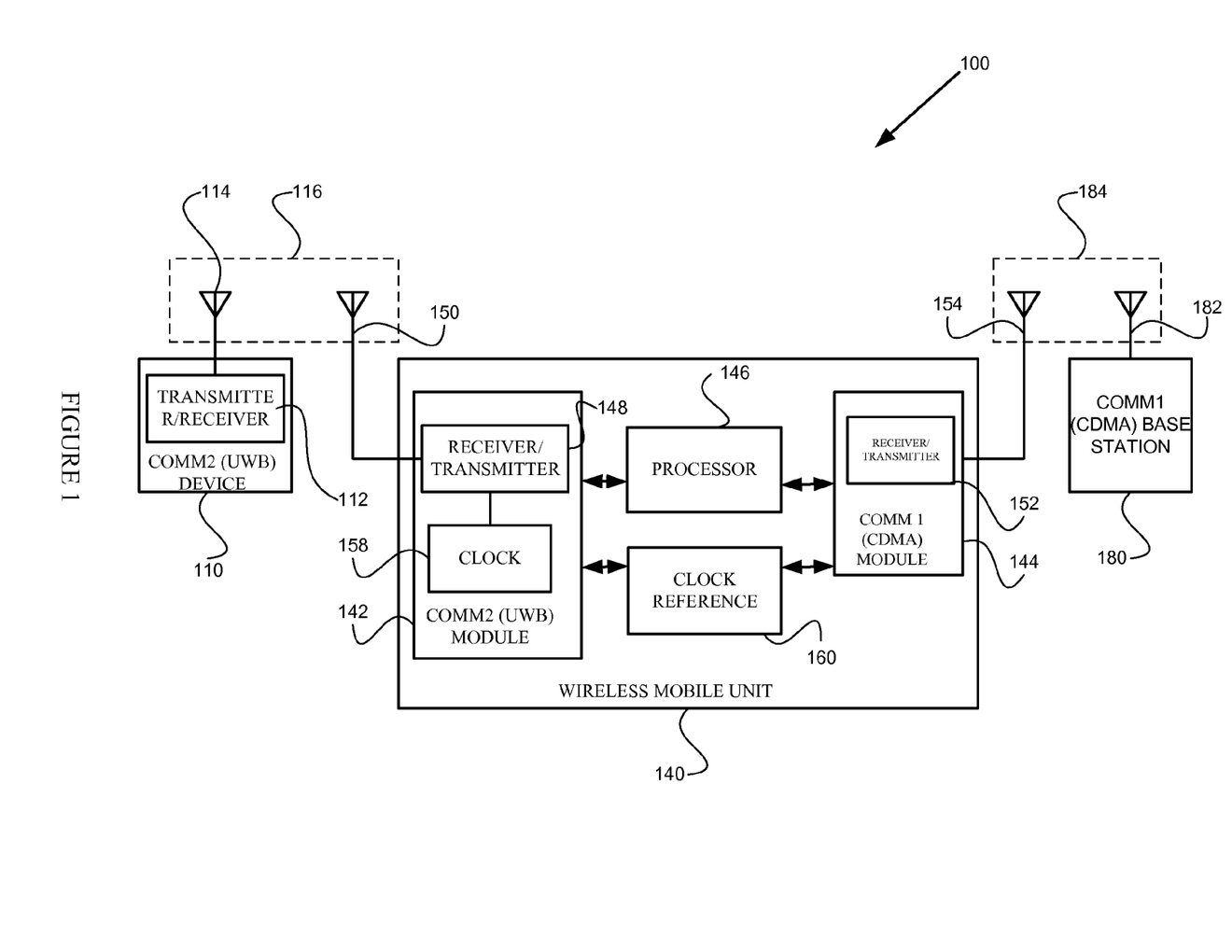
FIG. 1 is a block diagram of an exemplary wireless communication system in accordance with one embodiment of the invention.

FIG. 1 illustrates an exemplary wireless communication system in accordance with one embodiment of the invention. FIG. 1 shows a wireless mobile unit 140 with a COMM1 module 144 and a COMM2 module 142. The COMM1 module communicates with a COMM1 base station 180 and the COMM2 module communicates with a COMM2 device 110. COMM1 module 144 may be a CDMA module and COMM2 module 142 may be a UWB module, for example.

Exemplary wireless communication system 100 shown in FIG. 1 can comprise, for example, part of a code division multiple access ("CDMA") communication system. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in "high data rate" communication systems, such as that disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

As shown in FIG. 1, the invention's exemplary wireless communication system 100 comprises UWB device 110, wireless mobile unit 140 and CDMA base station 180. UWB device 110 can be any UWB-enabled device, for example, a laptop computer equipped with UWB components. UWB device 110 is configured to communicate with other UWB-enabled devices utilizing transmitter/receiver 112 and antenna 114.

Continuing with FIG. 1, wireless mobile unit 140 of wireless communication system 100 might be, for example, a UWB-enabled CDMA mobile phone in the present embodiment. As such, wireless mobile unit 140 comprises both UWB and CDMA components, i.e. UWB module 142 and CDMA module 144, respectively. According to the present invention, UWB module 142 and CDMA module 144 share processor 146, which can be configured to monitor and direct the wakeup/sleep cycles of UWB module 142 in standby mode and the wakeup/idle cycles of CDMA module 144 in idle mode. Further, as shown, wireless mobile unit 140 comprises clock reference 160, which can be configured to provide UWB module 142 and CDMA module 144 with a common source of time.

As discussed above, when a UWB-enabled device is not actively communicating in a UWB network, the device's UWB component assumes a standby mode from which it "wakes up" periodically in order to scan for other UWB-enabled devices. Further, during the wakeup process, the UWB component determines whether it is necessary to establish a connection with the UWB-enabled devices it encounters. Scanning the surrounding environment for other UWB-enabled devices is done in a manner known in the art and may involve, for example, the transmission, reception and processing of pilot signals. It is noted that the process of waking up, scanning and then shutting down performed by UWB module 142 is also referred to as a "UWB wakeup process" in the present application.

Referring again to FIG. 1, UWB module 142 has UWB transmitter/receiver 148 which is coupled to UWB antenna 150. During standby mode, UWB module 142 can utilize UWB transmitter/receiver 148 and UWB antenna 150 to scan the environment for other UWB-enabled devices, e.g. UWB device 110. In the present embodiment, UWB module 142 is configured to perform a UWB wakeup process twice every 1.28 seconds. However, those skilled in the art will appreciate that UWB module 142 can be configured to perform a UWB wakeup process at other intervals, for example every 1.28 seconds, every 0.32 seconds, or every 0.16 seconds. Further, it is appreciated that certain UWB specifications may require that UWB module 142 be configured to perform a UWB wakeup process, for example, at least once every 1.28 seconds, every 2.56 seconds, or any other interval required by the particular UWB specification. As shown in FIG. 1, UWB device 110 and UWB module 142 can communicate with each other via UWB airlink 116 using their respective transmitter/receiver and antenna elements.

UWB module 142 further comprises clock 158. In one embodiment, clock 158 is the internal clock for UWB module 142. Clock 158 can be, for example, a 28-bit counter that tracks a current UWB time and relays the current UWB time to processor 146. It is noted that the current UWB time is also referred to as "$UWB_{current}$" in the present application.

Continuing with FIG. 1, CDMA module 144 of wireless mobile unit 140 comprises CDMA transmitter/receiver 152, which is coupled to CDMA antenna 154. CDMA module 144 utilizes CDMA transmitter/receiver 152 and CDMA antenna 154 to communicate in a CDMA network, and more particularly with CDMA base station 180, via CDMA airlink 184. CDMA module 144 communicates with CDMA base station 180 by utilizing CDMA transmitter/receiver 152 and CDMA antenna 154 to transmit and receive signals. At the same time, CDMA base station 180 utilizes base station antenna 182 to receive signals from, and transmit signals to, CDMA module 144. Communication between CDMA module 144 and CDMA base station 180 is done in a manner known in the art.

When wireless mobile unit 140 is not actively communicating in the CDMA network, CDMA module 144 assumes an idle mode. CDMA module 144 engages in a number of tasks while it is in idle mode, including the task of synchronizing with CDMA system time. As is known in the art, the robustness of communication in a CDMA network depends in part on the time-synchronization of each component in the CDMA network, including mobile units, base stations, base station controllers, etc.

In order to synchronize with CDMA system time, CDMA module 144 utilizes transmitter/receiver 152 and CDMA antenna 154 to receive a pilot signal transmitted by CDMA base station 180. The received pilot signal is processed and the current CDMA system time determined from the data contained in the pilot signal. The processing of the pilot signal by CDMA module 144 and the determination of the current CDMA system time therefrom are done in a manner known in the art. In the present embodiment, the "current" time for CDMA module 144, which is also referred to as $CDMA_{current}$ in the present application, is set to the CDMA system time derived from the pilot signal. In one embodiment, clock reference 160 provides CDMA module 144 and UWB module 142 with a common source of time such that the "current" time for both modules, i.e. $UWB_{current}$ and $CDMA_{current}$, are the same. In another embodiment, clock reference 160 provides CDMA module 144 and UWB module 142 with a common clock, but the absolute values of $UWB_{current}$ and $CDMA_{current}$ may be different. Once $CDMA_{current}$ has been established, it is relayed to processor 146. It is noted that the process of waking up, synchronizing with base station 180 and shutting down performed by CDMA module 144 is also referred to as a "CDMA wakeup process" in the present application.

How frequently the CDMA component wakes up is governed by the slot cycle index ("SCI"), which can be set by either the phone or the base station in a manner known in the art. For example, if the SCI for CDMA module is zero, then CDMA module 144 performs a CDMA wakeup process every 1.28 seconds. Alternatively, the SCI can be set at one, for example, in which case a CDMA wakeup process is performed every 2.56 seconds; or the SCI can be set at two, in which case the wakeup process is performed every 5.12 seconds. It is noted that the lower the SCI, the more frequently CDMA module 144 performs CDMA wakeup processes. In the present embodiment, the SCI is for CDMA module 144 is set at zero, i.e. CDMA module 144 is set to perform a CDMA wakeup process every 1.28 seconds.

Continuing with FIG. 1, processor 146 uses the information it receives from clock 158, i.e. $UWB_{current}$, and from CDMA module 144, i.e. $CDMA_{current}$, in order to synchronize the wakeup schedule of UWB module 142 with the wakeup schedule of CDMA module 144. In the present embodiment, in order to synchronize the two wakeup schedules, processor 146 has to determine how much time remains until the next wakeup process is scheduled for both UWB module 142 and CDMA module 144. The respective times of the next scheduled wakeup process are hereinafter referred to as $UWB_{next}$ for UWB module 142, and as $CDMA_{next}$ for CDMA module 144.

Processor 146 can be configured to determine $UWB_{next}$ and $CDMA_{next}$ based on how frequently UWB wakeup processes and CDMA wakeup processes, respectively, are set to be performed. As stated above, UWB module 142 can be set to perform a UWB wakeup process at different intervals or frequency, e.g. once every 0.64 seconds, and CDMA module 144 can be set to perform a CDMA wakeup process every 1.28 seconds, every 2.56 seconds, or every 5.12 seconds, depending on its SCI. Thus, processor 146 can determine $UWB_{next}$ by monitoring when UWB module 142 last performed a UWB wakeup process and then calculating when the next UWB wakeup process is to be performed. Thus, as an illustration, if processor 146 determines that UWB module 142 last performed a UWB wakeup process at time T, and UWB module 142 is set to perform a UWB wakeup process every 0.64 seconds, then processor 146 can calculate $UWB_{next}$ to be T plus 0.64 seconds. Similarly, if processor 146 determines that CDMA module 144 last performed a CDMA wakeup process at time Y, and CDMA module 144 is set to perform a CDMA wakeup process every 1.28 seconds, i.e. its SCI is set at zero, then processor 146 can calculate $CDMA_{next}$ to be Y plus 1.28 seconds.

Once the time for the next scheduled wakeup process has been established in the manner described above, the time remaining until that next scheduled wakeup process can be determined by calculating the time difference between the current time and the time of that next scheduled wakeup process. Accordingly, processor 146 can determine the time remaining until the next scheduled CDMA wakeup process as $CDMA_{next}$ less $CDMA_{current}$. In the present application, the time remaining until the next scheduled CDMA wakeup process is also referred to as $CDMA_{interval}$.

Continuing with FIG. 1, processor 146 synchronizes the wakeup schedule of UWB module 142 to the wakeup schedule of CDMA module 144 by determining when the next UWB wakeup process is to be performed in relation to when the next CDMA wakeup process is to be performed. If processor 146 determines that the next UWB wakeup process is scheduled to be performed later than the next CDMA wakeup process, processor 146 will move the wakeup schedule of UWB module 142 forward such that UWB module 142 performs the next UWB wakeup process at the same time CDMA module 144 performs the next CDMA wakeup process. In other words, processor 146 can trigger UWB module 142 to perform its next UWB wakeup process at $CDMA_{next}$, rather than waiting until $UWB_{next}$. The next UWB wakeup process would thus be synchronized with the next CDMA wakeup process. It is noted that the "new" or "synchronized" time for the next UWB wakeup process is also referred to as $UWB_{new}$ in the present application. The task of synchronizing the wakeup schedule of UWB module 142 with the wakeup schedule of CDMA module 144 can be performed by software or in hardware in processor 146 of wireless mobile unit 140.

Synchronizing the two wakeup schedules reduces the power consumption of wireless mobile unit 140. Separately turning on the UWB module 142 and the CDMA module results in a waste of processor capability and power consumption since waking up a single module uses only a small fraction of processor capability. The power necessary to separately turn on UWB module 142 and CDMA module 144 when they perform their respective wakeup processes can be shared when the two modules are turned on at the same time. Thus, the processor capability is utilized more and less power is consumed.

FIG. 1 illustrates an exemplary wireless communication system, wherein a wireless mobile unit configured to communicate in both a UWB network and a CDMA network synchronizes the wakeup schedules of its UWB module and its CDMA module in order to reduce the power consumption associated with unsynchronized wakeup schedules.

It would be apparent to those skilled in the art that the COMM1 module 144 and the COMM2 142 module shown in FIG. 1 may be any communications module known in the art.

Figure 2:
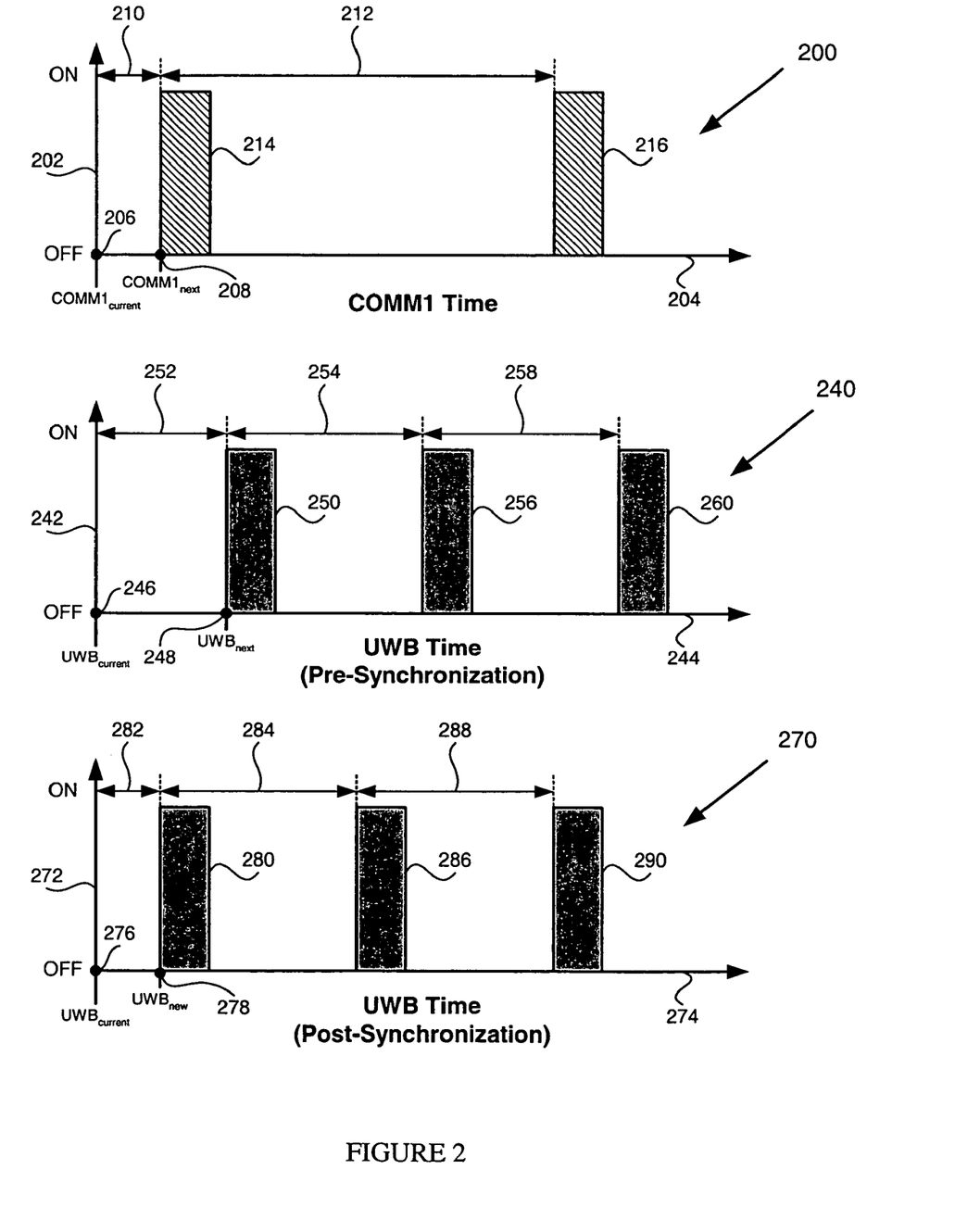
FIG. 2 shows three graphs illustrating the synchronization of wakeup schedules of UWB module and a COMM module.

Referring now to FIG. 2, graphs 200, 240 and 270 illustrate the result of synchronizing the wakeup schedule of a UWB module to the wakeup schedule of a first communications module (COMM1), such as a CDMA module in a wireless mobile unit 140 of FIG. 1, according to one embodiment. Thus, references will be made to wireless mobile unit 140 in order to facilitate discussion of graphs 200, 240 and 270.

Graph 200 illustrates a time sequence of the wakeup schedule for a COMM1 module in a wireless mobile unit, e.g. CDMA module 144 in wireless mobile unit 140. In graph 200, axis 202 shows the on/off state of COMM1 module 144, and axis 204 corresponds to time. The current COMM1 system time, which can be derived from a pilot signal received from a base station as discussed above, is shown as $COMM1_{current}$ time 206. CDMA module 144 is in idle mode at $COMM1_{current}$ time 206 and not performing a COMM1 wakeup process, i.e. CDMA module 144 is "off". However, at $COMM1_{next}$ time 208, COMM1 module 244 turns on and begins COMM1 wakeup process 214. The time interval between $COMM1_{current}$ time 206 and $COMM1_{next}$ time 208 is shown in graph 200 as interval 210. Thus, interval 210 represents the time period between the current COMM1 time and the time when the next COMM1 wakeup process is to be performed. Interval 212 represents the time between the start of COMM1 wakeup process 214 and the start of COMM1 wakeup process 216. Interval 212 can be, for example, 1.28 seconds, meaning that CDMA module 144 is set to perform a COMM1 wakeup process every 1.28 seconds. In other words, CDMA module 144's SCI is set at zero.

Referring now to graph 240 of FIG. 2, a time sequence of a wakeup schedule for the wireless mobile unit's UWB module, e.g. UWB module 142 of wireless mobile unit 140, prior to synchronization to the COMM1 module's wakeup schedule, is illustrated. In graph 240, axis 242 shows the on/off state of UWB module 142, while axis 244 corresponds to time. It is seen that at $UWB_{current}$ time 246, UWB module 142 is "off" and not performing a UWB wakeup process. However, at $UWB_{next}$ time 248, UWB module 142 turns on and begins UWB wakeup process 250. The time interval between $UWB_{current}$ time 246 and $UWB_{next}$ time 248 is represented by interval 252. Thus, interval 252 is the length of time between current UWB time and the time of the next scheduled UWB wakeup process, i.e. UWB wakeup process 250. Following an elapsed time equal to interval 254 subsequent to $UWB_{next}$ time 248, UWB module 142 performs UWB wakeup process 256, and further, following another elapsed time equal to interval 258, UWB module 142 performs UWB wakeup process 260. In the present embodiment, UWB module 142 can be set to perform a UWB wakeup process every 0.64 seconds. Thus, each interval 252, 254, and 258 is equal to 0.64 seconds. Those skilled in the art, however, will appreciate that UWB module 142 can be set to perform UWB wakeup processes at other intervals or frequencies, for example, once every 1.28 seconds or once every 0.32 seconds.

In comparing graphs 200 and 240 in FIG. 2, it is seen that interval 252 is greater than interval 210. In other words, the length of time before the next UWB wakeup process, i.e. UWB wakeup process 250, is scheduled to be performed is greater than the length of time before the next COMM1 wakeup process, i.e. COMM1 wakeup process 214, is scheduled to be performed. This difference in time between when the next wakeup processes are scheduled to be performed can result in a significant drain on the power supply of wireless mobile unit 140, because UWB module 142 and CDMA module 144 have to be turned on separately to perform their wakeup processes.

Referring now to graph 270, a post-synchronization time sequence for the wakeup schedule of UWB module 142 is illustrated. In graph 270, axis 272 shows the on/off state of UWB module 142, and axis 274 corresponds to time. Further, $UWB_{current}$ time 276 in graph 270 is the same as $UWB_{current}$ time 246 in graph 240, meaning that the "current" UWB time is the same in both graphs. However, as shown in graph 270, the next scheduled UWB wakeup process, i.e. UWB wakeup process 280, has been "rescheduled" as a result of synchronization and is now set to be performed at $UWB_{new}$ time 278. Thus, rather than having UWB module 142 perform the next UWB wakeup process at $UWB_{next}$ time 248 as shown in graph 240, the outcome of synchronizing the wakeup schedule of UWB module 142 to the wakeup schedule of CDMA module 144 is a temporal shift of the next UWB wakeup process, such that the next UWB wakeup process is performed at the same time as the next COMM1 wakeup process. More particularly, synchronization results in the equalization of interval 282 in graph 270 and interval 210 in graph 200, leading to the concurrent performance of UWB wakeup process 280 and COMM1 wakeup process 214, at $UWB_{new}$ time 278 and $COMM1_{next}$ time 208, respectively. This synchronization of UWB wakeup process 280 with COMM1 wakeup process 214 means that UWB module 142 and CDMA module 144 can be powered on at the same time to perform their wakeup processes, resulting in a significant reduction in power consumption by wireless mobile unit 140.

Continuing with graph 270, UWB wakeup process 286 follows UWB wakeup process 280 after a length of time equal to interval 284 has elapsed, and UWB wakeup process 290 follows after another elapsed time equal to interval 288. It is noted that UWB wakeup processes 286 and 290 are equivalent to UWB wakeup processes 256 and 260 in graph 240, shifted forward as a result of the synchronization of UWB wakeup process 280 with COMM1 wakeup process 214. Graphs 200, 240 and 270 in FIG. 2 thus illustrate the result of synchronizing the wakeup schedules of UWB module 142 and CDMA module 144 in wireless mobile unit 140, resulting in a reduction in the amount of power consumed by wireless mobile unit 140.

Figure 3:
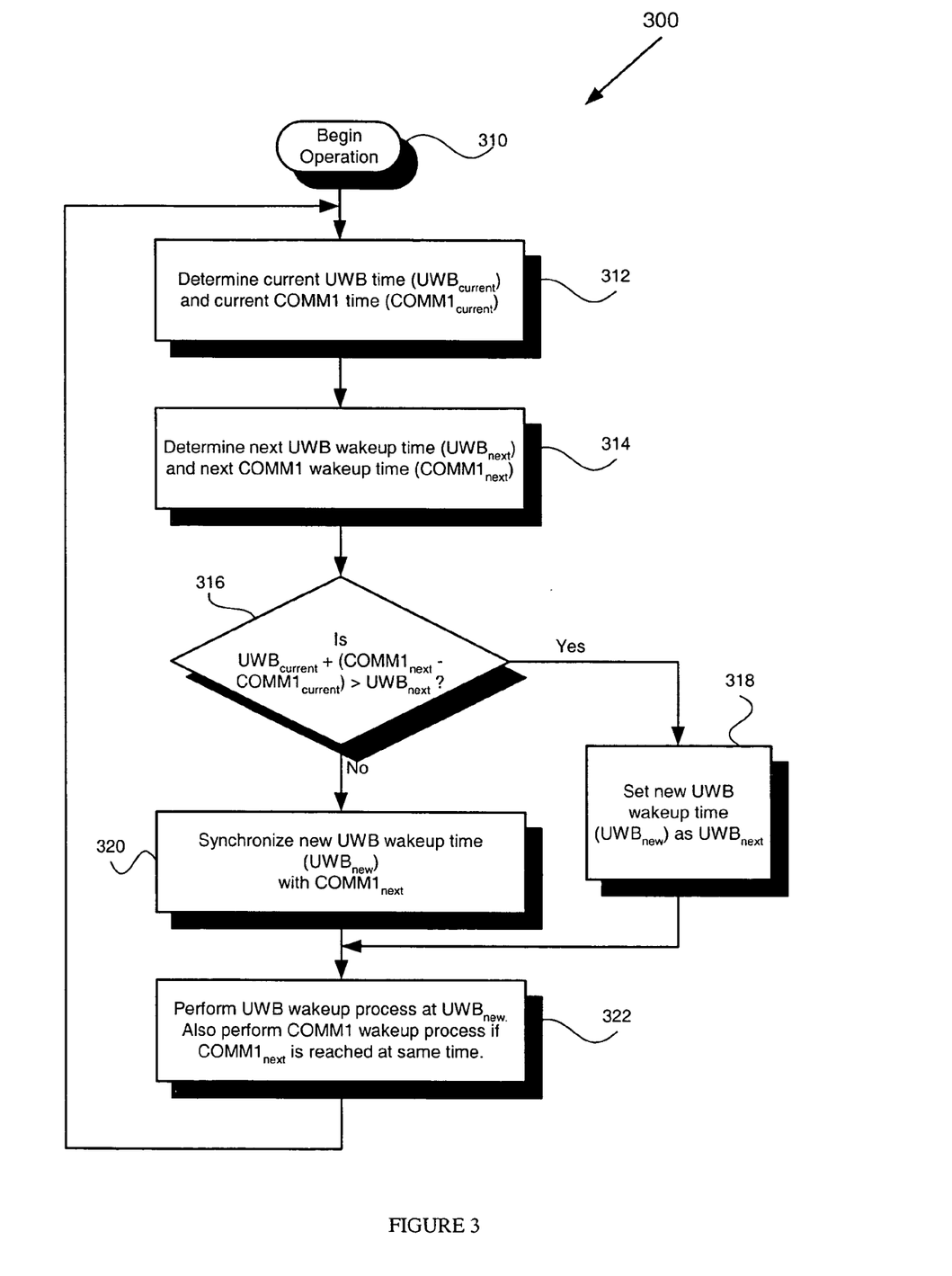
FIG. 3. is a flowchart of a process for synchronizing the wakeup schedules of a UWB module and a COMM module in a wireless mobile unit in accordance with one embodiment of the invention.

FIG. 3 shows flowchart 300 describing an exemplary process for synchronizing the wakeup schedules of a COMM2 module such as a UWB module and a COMM1 module in a wireless mobile unit in accordance with one embodiment. More particularly, the process shown in flowchart 300 can be performed by a wireless mobile unit such as wireless mobile unit 140 in FIG. 1, which comprises both a COMM2 component, e.g. UWB module 142, and a COMM1 component, e.g. CDMA module 144. Thus, for illustrative purposes, the process shown in flowchart 300 will be described in the context of wireless mobile unit 140 in FIG. 1.

Continuing with FIG. 3, the process for synchronizing the wakeup schedules of a UWB module and a COMM1 module in a wireless mobile unit begins at step 310 when, for example, wireless mobile unit 140 is not communicating in either a UWB network or a CDMA network. In other words, the process begins when UWB module 142 is in standby mode, and CDMA module 144 is idle. At step 312, the current UWB time and the current COMM1 time are determined. For example, current UWB time, or $UWB_{current}$, can be determined by an internal clock in UWB module 142, which tracks the current UWB time. Current COMM1 time, or $COMM1_{current}$, can be determined, for instance, from the data in a pilot signal transmitted by a base station and received by CDMA module 144. In one embodiment, clock reference 160 provides CDMA module 144 and UWB module 142 with a common source of time such that the "current" time for both modules, i.e. $UWB_{current}$ and $COMM1_{current}$, are the same. Also at step 312, $UWB_{current}$ and $COMM1_{current}$ are relayed to a processor such as processor 146 of wireless mobile unit 140 in FIG. 1 for further processing.

Continuing with flowchart 300 in FIG. 3, at step 314 of the process for synchronizing the wakeup schedules of a UWB module and a COMM1 module in a wireless mobile unit, the time for the next scheduled UWB wakeup process and the time for the next scheduled COMM1 wakeup process are determined. The time for the next scheduled UWB wakeup process, or $UWB_{next}$, is determined based on the time the preceding UWB wakeup process was performed by UWB module 142. $UWB_{next}$ is also a function of how often UWB wakeup processes are to be performed, for example, once every 1.28 seconds, every 0.64 seconds or every 0.32 seconds. In one embodiment, processor 146 monitors the time of the preceding UWB wakeup process and calculates $UWB_{next}$ by adding, for example, 1.28 seconds, 0.64 seconds or 0.32 seconds to the time of the last UWB wakeup process, depending on how often UWB wakeup processes are set to be performed. In a similar fashion, $COMM1_{next}$ can be calculated. In other words, processor 146 can monitor the time of the last COMM1 wakeup process and then add, for example, 1.28, 2.56 seconds or 5.12 seconds to the time of the last COMM1 wakeup process, depending on the SCI set for CDMA module 144, in order to calculate $COMM1_{next}$.

Continuing with flowchart 300, it is determined at step 316 whether $UWB_{current}$ plus the interval between $COMM1_{next}$ and $COMM1_{current}$ is greater than $UWB_{next}$. If $UWB_{current}$ plus the interval between $COMM1_{next}$ and $COMM1_{current}$ is determined to be greater than $UWB_{next}$, it indicates that the next COMM1 wakeup process is scheduled to be performed by CDMA module 144 after the next UWB wakeup process is scheduled to be performed by UWB module 142. In such an instance, the process for synchronizing the wakeup schedules of a UWB module and a COMM1 module in a wireless mobile unit proceeds to step 318, where the time for the next UWB wakeup process, also referred to as $UWB_{new}$, is set as $UWB_{next}$. The process then proceeds to step 322.

If at step 316 processor 146 determines instead that $UWB_{current}$ plus the interval between $COMM1_{next}$ and $COMM1_{current}$ is not greater than $UWB_{next}$, then the process proceeds to step 320. At step 320, the new time for the next UWB wakeup process, or $UWB_{new}$, is synchronized with $COMM1_{next}$, i.e. $UWB_{new}$ is set as $COMM1_{next}$. In other words, if processor 146 determines at step 316 that the next COMM1 wakeup process is scheduled to be performed before the next UWB wakeup process, processor 146 "reschedules" the next UWB wakeup process to be performed simultaneously with the next COMM1 wakeup process by synchronizing $UWB_{new}$ with $COMM1_{next}$.

The process for synchronizing the wakeup schedules of a UWB module and a COMM1 module in a wireless mobile unit then proceeds to step 322. At step 322, UWB module 142 performs a UWB wakeup process when $UWB_{new}$ is reached. It is noted that, if processor 146 had determined at step 316 that the time difference between $COMM1_{next}$ and $COMM1_{current}$ is not greater than the time difference between $UWB_{next}$ and $UWB_{current}$, such that $UWB_{new}$ is synchronized with $COMM1_{next}$ at step 320, CDMA module 144 would also perform a COMM1 wakeup process at step 322. In this manner, i.e. UWB module 142 and CDMA module 144 performing their wakeup process at the same time, the power consumption of wireless mobile unit 140 can be significantly reduced since the two modules can be powered up simultaneously.

Following step 322, the process for synchronizing the wakeup schedules of a UWB module and a COMM1 module in a wireless mobile unit returns to step 310. The process continues until, for example, UWB module 142 exits standby mode or CDMA module 144 exits idle mode.

It is appreciated by those of skill in the art that the steps of flowchart 300 can be interchanged without departing from the scope of the present invention. Flowchart 300 in FIG. 3 thus illustrates an exemplary process for synchronizing the wakeup schedules of a UWB module and a COMM1 module in a wireless mobile unit, resulting in a reduction in power consumption by the wireless mobile unit, in accordance with one embodiment.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless mobile unit. In the alternative, the processor and the storage medium may reside as discrete components in a wireless mobile unit.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for synchronizing a wakeup schedule for an Ultra-Wideband (UWB) module and a wakeup schedule for a second communications module in a wireless mobile unit, the method comprising:
    computing a next wakeup time for the UWB module;
    computing a next wakeup time for the second communication module; and
    modifying the next wakeup time for the second communication module to a new wakeup time for the second communication module that is substantially synchronized to the next wakeup time for the UWB module in response to the next wakeup time for the UWB module being earlier than the next wakeup time for the second communication module.

2. A method for synchronizing a wakeup schedule for an Ultra-Wideband (UWB) module and a wakeup schedule for a communications module in a wireless mobile unit, the method comprising:
    calculating a next communications wakeup time;
    calculating a next UWB wakeup time; and
    changing the next UWB wakeup time to a new UWB wakeup time that is substantially synchronized to the next communications wakeup time in response to the next communications wakeup time being earlier than the next UWB wakeup time.

3. The method of claim 2 further comprising:
    determining a current communications time; and
    determining a current UWB time.

4. The method of claim 3 further comprising determining a communications interval, the communications interval equaling the next communications wakeup time less the current communications time.

5. The method of claim 4 further comprising synchronizing the new UWB wakeup time to the next communications wakeup time in response to the current UWB time plus the communications interval being less than the next UWB time.

6. The method of claim 2 further comprising performing a UWB wakeup process and a communications wakeup process substantially at the new UWB wakeup time.

7. The method of claim 6 wherein the performing comprises powering on the UWB module and the communications module substantially simultaneously.

8. A method for synchronizing a wakeup schedule for an Ultra-Wideband (UWB) module and a wakeup schedule for a communications module in a wireless mobile unit, the method comprising:
    determining a current communications time;
    determining a current UWB time;
    determining a next UWB wakeup time;
    determining a next communications wakeup time;

calculating a communications interval, the communications interval equaling the next communications wakeup time less the current communications time; and changing the next UWB wakeup time to a new UWB wakeup time that is substantially synchronized to the next communications wakeup time in response to the current UWB time plus the communications interval being less than the next UWB wakeup time.

9. The method of claim 8:
wherein the determining the next communications wakeup time comprises determining the next communications wakeup time prior to the calculating the communications interval; and
wherein the determining the next UWB wakeup time comprises determining the next UWB wakeup time prior to the synchronizing the new UWB wakeup time.

10. The method of claim 8 further comprising performing a UWB wakeup process and a communications wakeup process substantially at the new UWB wakeup time.

11. The method of claim 10 wherein the performing comprises powering on the UWB module and the communications module substantially simultaneously.

12. The method of claim 8 wherein the wireless mobile unit comprises a UWB-enabled communications mobile phone.

13. A wireless mobile unit comprising:
a communications module configured to perform a communications wakeup process at a next communications wakeup time;
an Ultra-Wideband (UWB) module configured to perform a UWB wakeup process at a next UWB wakeup time, wherein the UWB module comprises a clock, the clock being configured to track a current UWB time; and
a processor configured to modify the next UWB wakeup time to a new UWB wakeup time that is substantially synchronized to the next communications wakeup time in response to the next communications wakeup time being earlier than the next UWB wakeup time.

14. The wireless mobile unit of claim 13 wherein the UWB module is configured to perform the UWB wakeup process at the new UWB wakeup time in response to the next communications wakeup time being earlier than the next UWB wakeup time.

15. The wireless mobile unit of claim 13 wherein the processor is further configured to calculate a communications interval, the communications interval equaling the next communications wakeup time less the current communications time.

16. The wireless mobile unit of claim 15 wherein the processor is further configured to synchronize the new UWB wakeup time to the next communications wakeup time in response to the current UWB time plus the communications interval being less than the next UWB wakeup time.

17. The wireless mobile unit of claim 13 wherein the communications module performs the communications wakeup process and the UWB module performs the UWB wakeup process substantially at the new UWB wakeup time.

18. The wireless mobile unit of claim 17 wherein the communications module and the UWB module are configured to power on substantially simultaneously.

19. The wireless mobile unit of claim 13 wherein the wireless mobile unit is a UWB-enabled communications mobile phone.

20. A wireless unit comprising:
means for storing data;
means for performing a communications wakeup process at a next communications wakeup time;
means for performing an Ultra-Wideband (UWB) wakeup process at a next UWB wakeup time;
means for computing the next communications wakeup time;
means for computing the next UWB wakeup time; and
means for modifying the next UWB wakeup time to a new UWB wakeup time that is substantially equal to the next communications wakeup time in response to the next communications wakeup time being earlier than the next UWB wakeup time.

21. A digital signals processing apparatus, comprising:
a memory means for storing digital data; and
a digital signal processing means for interpreting digital signals to synchronize a wakeup schedule for an Ultra-Wideband (UWB) module and a wakeup schedule for a communications module in a wireless mobile unit by:
computing a next communications wakeup time;
computing a next UWB wakeup time; and
changing the next UWB wakeup time to a new UWB wakeup time that is substantially equal to the next communications wakeup time in response to the next communications wakeup time being earlier than the next UWB wakeup time.

22. The apparatus of claim 21, the digital signal processing means further interpreting digital signals to establish the next UWB wakeup time before the changing.

23. A computer-readable medium having stored thereon computer-executable instructions for performing operations, comprising:
calculating a next communications wakeup time;
calculating a next UWB wakeup time; and
changing the next UWB wakeup time to a new UWB wakeup time that is substantially synchronized to the next communications wakeup time in response to the next communications wakeup time being earlier than the next UWB wakeup time.

24. The computer-readable medium of claim 23, the computer-executable instructions further for:
determining a current communications time; and
determining a current UWB time.

25. The computer-readable medium of claim 24, the computer-executable instructions further for:
determining a communications interval, the communications interval equaling the next communications wakeup time less the current communications time.

26. The computer-readable medium of claim 25, the computer-executable instructions further for:
synchronizing the new UWB wakeup time to the next communications wakeup time in response to the current UWB time plus the communications interval being less than the next UWB time.

* * * * *